Patented Apr. 15, 1941

2,238,301

UNITED STATES PATENT OFFICE 2,238,301

BLUEPRINT COATING

Robert Bowling Barnes, Stamford, Garnet Philip Ham, Riverside, and Leonard Patrick Moore, Stamford, Conn., assignors to American Cyanamid Company, New York, N. Y., a corporation of Maine No Drawing. Application April 10, 1940,
Serial No. 328,886

6 Claims. (Cl. 95—7)

This invention relates to blueprint paper and blueprint coating solutions.

Standard blueprint coating solutions contain essentially two ingredients, a light sensitive ferric salt usually ferric ammonium oxalate, and a ferricyanide which is usually potassium ferricyanide. The blueprint coatings vary in their characteristics such as printing speed and latitude, of range of exposure over which satisfactory depths of blue can be obtained. In order to retain satisfactory results the coating solution must normally contain at least 5 grams of potassium ferricyanide per 100 cc. Reduction in the amount results in inferior coatings.

According to the present invention it has been found that ammonium ferricyanides such as the diammonium sodium ferricyanide possess an extraordinary property of giving improved intensity of blue, improved latitude and better keeping qualities without developing blue backgrounds, and smaller amounts of the ferricyanide can be used. Thus, for example, as little as 1 gram per 100 cc. of blueprint coating will give satisfactory results comparable to those obtained with 5 grams of the potassium ferricyanide. Blue intensity and latitude increase until an optimum is reached at 2.5 grams and with larger amounts the improved latitude is maintained but there is a slight falling off of intensity of blue. Inasmuch as the diammonium sodium ferricyanide differs but little in cost from potassium ferricyanide, the present invention permits obtaining improved results with a very marked saving, 50% or more, in ferricyanide.

It is an advantage of the present invention that none of the technique of solution preparation, coating, drying, sensitizing, and the like, are necessary. The ammonium sodium ferricyanide may be used in place of the potassium ferricyanide, but in reduced quantities, without changing any other of the factors. The improvements of the present invention are obtainable in simple coating solutions which contain only the ferric salt and ferricyanide, and any coating solutions which are buffered or in which inhibitors are present which increase the stability and storage life of the coating. The increase in blue intensity, in latitude, and the decrease in ferricyanide consumption are thus obtained without any material off-setting disadvantage.

I do not know to what the enhanced effectiveness of the diammonium sodium ferricyanide is to be attributed. The operation of a blueprint coating, in spite of years of experience, still involves many factors that are only imperfectly understood, and accordingly the present invention is not intended in any way to be limited to any theory of operation.

The invention will be further described in conjunction with a specific example giving a simple blueprint coating formulation. The parts are given by weight except in the case of liquids which are in corresponding parts by volume.

*Example 1*

| | |
|---|---|
| Water | 100.00 |
| Ferric ammonium oxalate | 25.0 |
| Diammonium sodium ferricyanide | 2.5 |

The solution has a pH of about about 4.25 at 25° C. and gives more intense blues, better latitude and whiter backgrounds than the same formulation with 5 parts of potassium-ferricyanide.

The amount of the diammonium sodium ferricyanide may be varied between 1 and 4 parts without materially affecting the pH. Blue intensities and latitudes fall off to some extent if less than 2.5 parts are used and latitudes remain, but blues fall off slightly when more than 2.5 but not more than 4 parts are used.

We claim:
1. A blueprint coating solution containing a light sensitive ferric salt and diammonium sodium ferricyanide as its main ferricyanide component.

2. A blueprint coating solution containing ferric ammonium oxalate and diammonium sodium ferricyanide in the proportion of from 1 part to 4 parts per 25 parts of ferric ammonium oxalate.

3. A blueprint coating solution containing ferric ammonium oxalate and diammonium sodium ferricyanide in the proportion of about 1 part diammonium sodium ferricyanide to 10 parts ferric ammonium oxalate.

4. A blueprint paper having a coating containing a light sensitive ferric salt and diammonium sodium ferricyanide.

5. A blueprint paper having a coating containing ferric ammonium oxalate and diammonium sodium ferricyanide in the proportion of from 1 to 4 parts per 25 parts of ferric ammonium oxalate.

6. A blueprint paper having a coating containing ferric ammonium oxalate and diammonium sodium ferricyanide in the proportion of about 1 part diammonium sodium ferricyanide to 10 parts ferric ammonium oxalate.

ROBERT BOWLING BARNES.
GARNET PHILIP HAM.
LEONARD PATRICK MOORE.